(12) United States Patent
Varampetran (10) Patent No.: US 11,956,635 B2
(45) Date of Patent: Apr. 9, 2024

(54) AUTHENTICATING A CLIENT DEVICE (71) Applicant: Hewlett Packard Enterprise Development LP, Houston, TX (US)

(72) Inventor: Nimal Mahesh Varampetran, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/580,195

(22) Filed: Jan. 20, 2022

(65) Prior Publication Data
US 2023/0232233 A1    Jul. 20, 2023

(51) Int. Cl.
*H04W 12/00*     (2021.01)
*H04W 12/088*    (2021.01)
*H04W 12/69*     (2021.01)

(52) U.S. Cl.
CPC ....... *H04W 12/088* (2021.01); *H04W 12/009* (2019.01); *H04W 12/69* (2021.01)

(58) Field of Classification Search
CPC .. H04W 12/088; H04W 12/009; H04W 12/69
See application file for complete search history.

(56) References Cited

U.S. PATENT DOCUMENTS

| | | | |
|---|---|---|---|
| 7,512,970 B2 | 3/2009 | Naftali et al. | |
| 7,587,751 B2 | 9/2009 | Potter et al. | |
| 7,983,418 B2 | 7/2011 | Oyama et al. | |
| 8,793,782 B1 | 7/2014 | Su | |
| 9,009,778 B2 | 4/2015 | Pearce et al. | |
| 9,100,813 B2 * | 8/2015 | Lovich | H04W 48/04 |
| 9,350,737 B2 * | 5/2016 | Fernandez Alonso | H04L 63/10 |
| 9,524,388 B2 * | 12/2016 | Oberheide | G06F 21/45 |
| 9,866,546 B2 * | 1/2018 | Brannon | H04L 63/0815 |
| 10,206,111 B2 * | 2/2019 | Jin | H04W 48/14 |
| 10,277,606 B2 * | 4/2019 | Hayton | H04W 12/37 |
| 10,382,595 B2 * | 8/2019 | Tola, Jr. | H04L 69/22 |
| 10,757,103 B2 * | 8/2020 | Irwan | H04W 12/068 |
| 11,122,431 B2 * | 9/2021 | Pazhyannur | H04W 12/06 |
| 11,200,488 B2 * | 12/2021 | Wong | G06N 7/01 |
| 11,496,894 B2 * | 11/2022 | Sethi | H04L 63/0892 |
| 2004/0107360 A1 * | 6/2004 | Herrmann | H04L 63/20 726/1 |
| 2005/0064845 A1 | 3/2005 | Clingerman et al. | |
| 2005/0120213 A1 | 6/2005 | Winget et al. | |
| 2006/0185013 A1 | 8/2006 | Oyama et al. | |
| 2008/0222714 A1 | 9/2008 | Wahl | |

(Continued)

*Primary Examiner* — Viral S Lakhia
(74) *Attorney, Agent, or Firm* — Hewlett Packard Enterprise Patent Department (57) ABSTRACT

Examples described herein relate to techniques for authenticating a client device by obtaining device-type information during an initial phase of authentication process. According to some examples, identifying a client device intending to connect to a network and sending an identity-request thereto. Receiving an identity-response from the client device along with device-type information. Identifying a device category from a set of device categories corresponding to identified device-type information. Selecting a device policy applicable to the identified device-type information. Authenticating the client device to enable access to the network and applying the selected device policy to the client device.

19 Claims, 7 Drawing Sheets

(56) References Cited

U.S. PATENT DOCUMENTS

| | | | |
|---|---|---|---|
| 2014/0109076 A1* | 4/2014 | Boone | G06F 21/572 |
| | | | 717/170 |
| 2014/0256291 A1* | 9/2014 | Zhou | H04L 63/0892 |
| | | | 455/411 |
| 2016/0088026 A1* | 3/2016 | Mohamad Abdul | G06F 8/65 |
| | | | 726/1 |
| 2016/0127352 A1* | 5/2016 | Xu | H04L 63/0815 |
| | | | 726/8 |
| 2017/0208054 A1* | 7/2017 | Hanay | H04L 63/06 |
| 2018/0310172 A1* | 10/2018 | Sethi | H04W 12/06 |
| 2020/0053169 A1* | 2/2020 | Mani | H04L 61/4541 |
| 2020/0259817 A1* | 8/2020 | Natarajan | H04L 63/0281 |
| 2020/0304543 A1* | 9/2020 | Hamlin | H04L 63/0876 |
| 2022/0131882 A1* | 4/2022 | Akella | H04W 12/088 |

* cited by examiner

AUTHENTICATING A CLIENT DEVICE

BACKGROUND

In certain network environments, users can use their personal devices to access certain services offered on a network. Bring Your Own Device (BYOD) is an example policy that may allow users to use personal devices to connect to a network environment. A user may have to provide credentials, undergo multi-factor authentication processes, etc. to authenticate a device. Authentication can be a process of verifying an identity of a user/client device. Upon successful authentication, a user device may have to undergo an authorization process, which can be used to determine access and/or privileges accorded to a user. For example, authorization process may be used to determine access to various resources, information, applications, etc. An enterprise email may be an example of an application, which a user may access from a personal device. Further, the authorization process may be used to determine privileges, such as read-only, read and write, etc.

BRIEF DESCRIPTION OF THE DRAWINGS

The present disclosure, in accordance with one or more various examples, is described in detail with reference to the following figures. The figures are provided for purposes of illustration only and merely depict examples, wherein.

The figures are not exhaustive and do not limit the present disclosure to the precise form disclosed.

DETAILED DESCRIPTION

Many enterprise networks support Bring Your Own Device (BYOD) policies. Users can connect to an enterprise network through a wired and/or wireless connection using their personal devices (henceforth, referred to as "client devices"). In such networks, users may be able to access the network from any communication-enabled client device, for example, a laptop, a tablet, or a mobile phone. Various standards may be used for authentication of a user identity before providing network access to such a user device. Herein, for brevity, a process for authentication and authorization are collectively referred to as 'authentication.' Institute of Electrical and Electronics Engineers (IEEE) 802.1x can be considered an example of the popular standards used for authenticating user devices. Generally, an IEEE 802.1X based authentication may include a client device, a network device, and an authentication server. A network device can provide a communication link between a user device and an authentication server/enterprise network. An authentication server may verify requests for network access and determine privileges.

Generally, until successful authentication, a client device may be allowed to exchange authentication traffic, such as IEEE 802.1x authentication traffic, and exchange of data may be restricted. During the authentication process, a network device, such as an access point, may communicate with a client device and relay information between the client device and an authentication server. A typical authentication process may include, inter alia, an identity phase, and an access phase. During an identity phase, a client device may send an identifier (e.g., user ID) to a network device and that is in turn relayed to an authentication server. During an access phase, an authentication server may check user credentials to determine if network access is to be granted or rejected and determine which policies may be applied.

Understanding device-type information can be crucial for applying appropriate policies, especially in BYOD architecture. Device-type information can include a hardware information, a software information, a firmware information, etc. Knowing a device-type can help in securing network access by applying device-specific policies. Traditionally, a sandwiched authentication process may be used to identify and authorize a client device onto a network. For instance, upon initial authentication, a client device may be allowed to access a network. Then, an active discovery method (e.g., Simple Network Management Protocol [SNMP], Network Mapping [Nmap] scan, etc.) or a passive discovery method (e.g., Dynamic Host Configuration Protocol [DHCP], User-Agent—Hypertext Transfer Protocol [HTTP], etc.) may be used to identify a device-type. After identifying a device-type, a client device may be asked to authenticate again. During this second authentication and based on the device-type information (identified previously), an authentication policy may be determined by an authentication server. Some of these existing authentication processes can be cumbersome considering discovery and authentication steps and consume significant network bandwidth. Moreover, an authentication server capable of performing active/passive discovery may have to be used. Network ports may have to be kept open between an authentication server and a client device during this process, which can be a security risk.

Further, during an authentication process, an authentication server may cache a device's information on first authentication. In some instances, device information may be cached for a longer time, which can be due to a delay in a discovery method in the aforementioned sandwiched authentication process. This may cause a client device to wait in an inappropriate access policy, such as a restricted access policy. In some other instances, expiry of device information that is cached and/or MAC address randomization of a client device may occur, and a client device may have to go through sandwiched authentication process more than once, which may further delay the authentication process.

In the present disclosure, example techniques to authenticate a client device, such as a BYOD type device, intending to connect to a network are disclosed. A network device, such as an Access Point or an Ethernet Switch, may act as an intermediary device that facilitates authentication of a client device by an authentication server. A network device may probe a client device to share a device-type information during an early phase (e.g., identity phase) of an authentication process. A network device may share a device-type information discovered as a result of the network device's probe of the client device with an authentication server so that the authentication server can reject access or select an appropriate access policy, an authentication method, and/or permission(s) for the client device.

Obtaining a device-type information during an initial phase of the authentication process enables an authentication server to select an applicable policy (e.g., access policy) whereby the client device may not be waiting in an inappropriate policy due to any delay in a device-type discovery process. Since a device-type information can be queried during an identity phase, network bandwidth can be optimally used for communication with client devices intending to connect to the network. Devices falling under a restricted device category can thereby be precluded from accessing the network based on the device-type information. Thus, an efficient technique for identifying a device-type information with minimal or no dependency on a post-authentication discovery process is disclosed. Further, the present disclosure provides techniques to authenticate by aiming to complete the authentication process before cache expiry and/or MAC address randomization as delays associated with traditional processes (e.g., delays due to discovery methods) are reduced or eliminated. Thus, a client device can be authenticated during a single authentication cycle, whereby delays caused due to repetition may be reduced or eliminated.

According to some examples, to aid in the authentication of a client device, a network device may utilize an Extensible Authentication Policy (EAP) for authentication. The network device may include an attribute in an identity-request message (e.g., EAP-identity) being sent to a client device. For example, a request for a device-type information attribute can be a Boolean attribute, such that the attribute is set to 'True' to probe a client device. In response to a request for device-type information, a client device may have an option to send a device-type information. For example, a device-type information can be a string or a character and can be sent along with an identity-response message (e.g., EAP-response) being sent to a network device. A network device may further send this device-type information to an authentication server as a vendor-specific attribute, such that the authentication server may select an appropriate access policy. For example, an authentication server may reject network access to a client device upon identification of the device-type information to be an invalid/restricted device-type information, even before verification of credentials. Thus, a client device may not be left to wait in an inappropriate access policy. An invalid device is not allowed to connect to a network and immediately rejected access to enhance security. In some other examples, an authentication server may use this device-type information to choose an authentication policy for authentication of a client device, which otherwise occurs after authentication of a client device and/or identifying the device-type post authenticating and allowing the client to the network. No additional discovery method and/or network bandwidth may be utilized to identify device-type and enforce network access. Evaluation and verification of a client device may be performed in real-time, whereby dependency on a cache server is limited or avoided.

The following detailed description refers to the accompanying drawings. Wherever possible, the same reference numbers are used in the drawings and the following description to refer to the same or similar features. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Figure 1A:
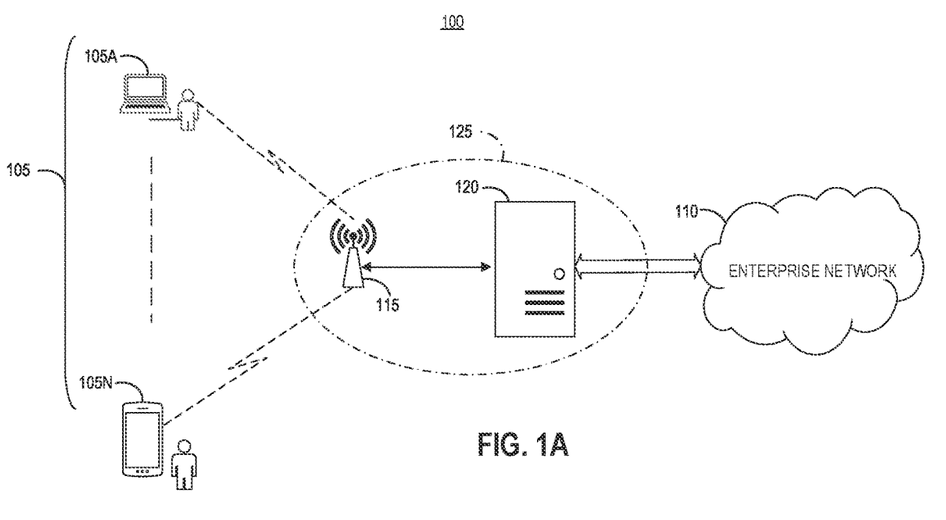
FIG. 1A depicts a network environment that may be used for authentication of a client device, according to various examples of the present disclosure.

Before describing examples of the disclosed techniques in detail, it is useful to describe an example network environment with which these techniques might be implemented in various applications. FIG. 1A illustrates an example of a network environment 100 that may be implemented for an organization, such as a business, educational institution, governmental entity, healthcare facility, an enterprise, or other organization. The network environment 100 may be constituted by one or more physical or geographical sites, for example, a primary site, and/or remote sites. The primary site and/or the remote sites may be disposed in communication (not shown).

Now referring to FIG. 1A, a network environment 100 can be used for authenticating one or more client devices 105A-105N (hereinafter, reference may be made to 'client device 105A' for brevity). A client device may correspond to a user who intends to connect to an enterprise network 110 using a personal device. The client device 105A can be a BYOD type device, which may include, but not limited to, a laptop, a smartphone, or any other personal communication device. In some examples, the enterprise network 110 may be an organization network that hosts proprietary information, resources, applications, etc. The client devices 105A, . . . , 105N may connect to a network device 115, which can be an Ethernet switch or a wireless access point. Thus, the network device 115 may enable the client device to connect to the enterprise network 110 through a wired and/or wireless connection. In some examples, the network device 115 can be a program, application, hardware, firmware, etc., configured to provide access to a network and facilitate authentication of a client device 105.

In the illustrative example of FIG. 1A, the client device 105A may establish a wireless link. After establishing a link with the network device 115, the client device 105A may, initially, have a limited access. The client device 105A may have to undergo an authentication process, which can be used for validating user credentials and applying a user policy, before getting access to the enterprise network 110. Thus, the network device 115 may protect critical information on the network environment 100 by restricting access.

Figure 1B:
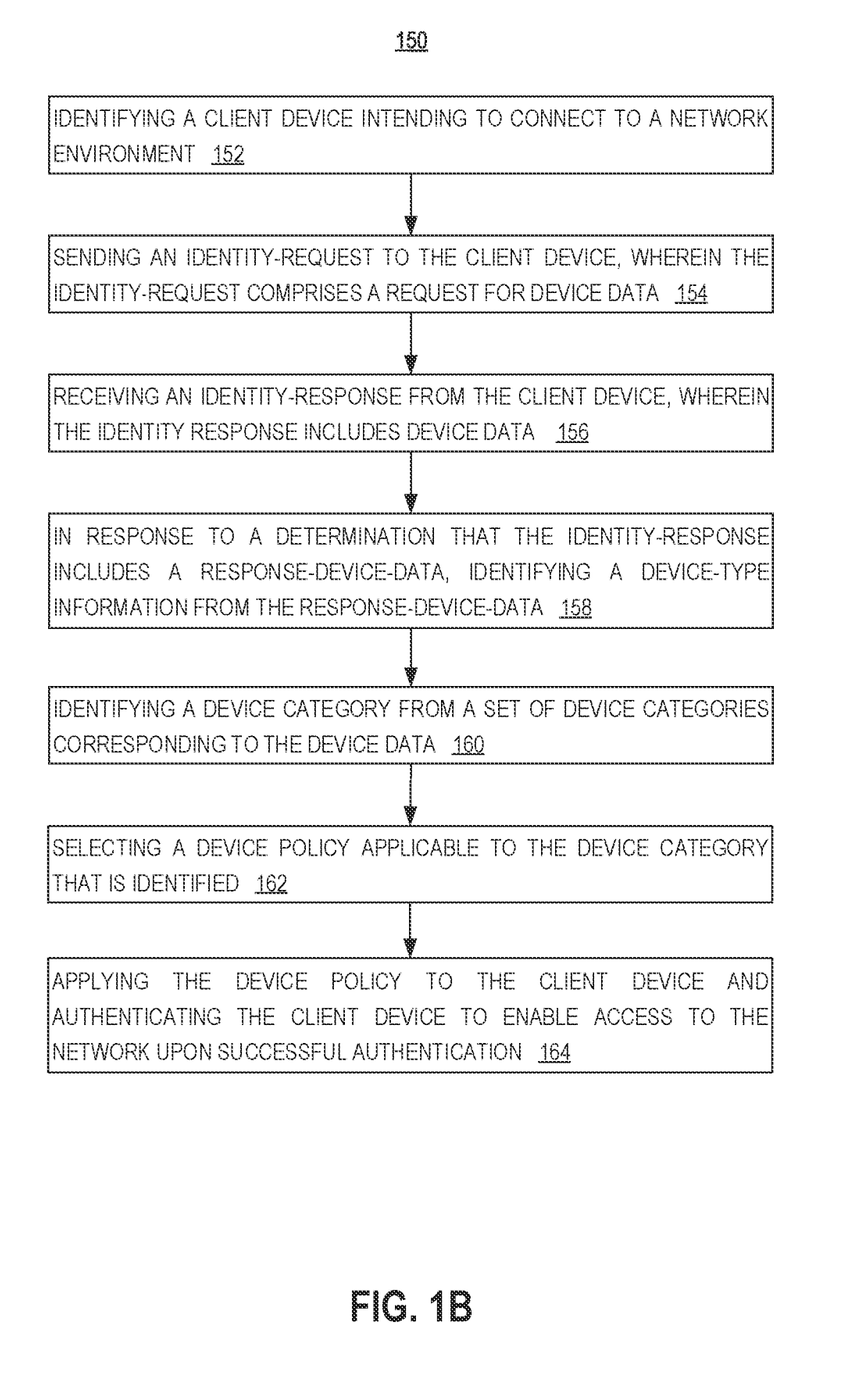
FIG. 1B illustrates an example of a method of authentication of a client device, according to the present disclosure.

In some examples, the network environment 100 may include an authentication server 120 that is configured to perform an authentication process. The authentication process may be based on the validation of user credentials (e.g., username, password, digital certificates, etc.). In some examples, an Extensible Authentication Protocol (EAP) may be used for authentication. The EAP protocol may be based on the Institute of Electrical and Electronics Engineers (IEEE) 802.1X standard. The network device 115 may receive user identity, credentials, etc., and may forward this information to the authentication server 120 for verification. Further, the authentication server 120 can store user credentials, permissions granted to a specific user type, access to applications/services on an enterprise network, etc. that can be used for authentication and application of network access. An example method 150 of authentication of a client device (e.g., client device 105) is illustrated in FIG. 1B.

The example method 150 is discussed in conjunction with the illustrative example of FIG. 1A for authenticating a client device (e.g., the client device 105A) by an authenticator system 125. The authenticator system 125 may include a network device (e.g., the network device 115) and an authentication server (e.g., the authentication server 120).

Now referring to the method 150, at block 152, the network device 115 may identify the client device 105A intending to connect to the enterprise network 110. In some examples, the client device may undergo an association process with the network device 115. Example of association process may include, but not limited to, a client device requesting a wireless connection with the network device 115. For example, an association process may include an association process based on the IEEE 802.11 standard, a mechanism to connect to the network environment 100.

At block 154, the network device 115 may send an identity-request (e.g., user identity) to the client device 105A. Through the identity-request, the network device may probe the client device 105A for device data in addition to user identity.

At block 156, the network device 115 of the authenticator system 125 may receive an identity-response from the client device. The identity-response may be an identifier for the user/client device 105A. Along with the identifier, the network device 115 may receive a device data (e.g., response-device-data) along with the identity-response from the client device 105A.

At block 158, the authenticator system 125 may identify a device-type information from the response-device-data, which can be in response to a determination that the identity-response may include a response-device-data. In some examples, the response-device-data can be an optional field and some client devices may not send their device data.

At block 160, the authenticator system 125 may identify a device category, from a set of device categories, that corresponds to the identified device data (e.g., device-type) that is identified. For example, if BYOD/client device is a laptop then one access policy may be used and for a mobile phone, a different access policy may be used. Further, the set of device categories may include a restricted device category.

According to some examples, the authenticator system 125 may be configured to discern between at least two device types comprising at least a mobile phone type and a laptop type based on the device-type information. Thus, if the client device 105A belongs to a restricted device category, then the authentication server 120 may reject access even before verifying any user credentials of the client device 105A. In other words, the authenticator system 125 may be configurable to permit access to one of the at least two device types while denying access to at least the other of the at least two device types.

At block 162, the authenticator system 125 selects a device policy applicable to the device-type information. The authenticator system 125 may include a plurality of device policies and each device policy may include an access policy, one or more privileges for the client device, and a device authentication method. Depending on the device-type, the authentication server 120 may select a device authentication method. At block 164, the authenticator system 125 may apply the device policy that is selected to the client device 105A and authenticate the client device to enable access to the enterprise network 110 upon successful authentication. For example, authentication may include negotiation between the client device 105A and the authenticator system 125 for verification of credentials.

Figure 2:
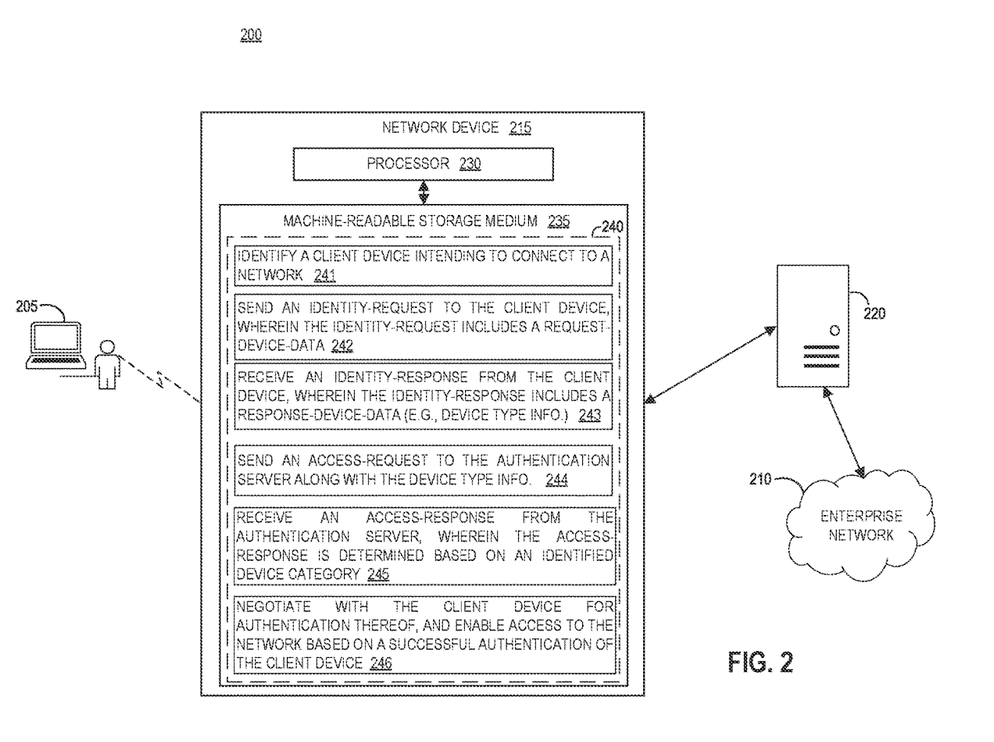
FIG. 2 illustrates an example of a network device disposed in a network environment for authentication of a client device, according to the present disclosure.

FIG. 2 illustrates a schematic diagram of an example of a network device 215 deployed in a network environment 200. The network device 215 may include a processor 230 and a machine-readable storage medium 235 for authenticating a client device 205 consistent with the present disclosure. The client device may be a supplicant. In some examples, a 'supplicant' may be a software component or code running on a client device that provides credentials for authentication. The client device 205 may intend to connect to the network environment 200 and may undergo an authentication process to access an enterprise network 210, as discussed herein.

In some examples, the machine-readable storage medium 235 may store instructions 240 (e.g., 241, 242, 243, 244, 245, 246) executed by the processor 230 to perform the operations as described herein. The operations are not limited to a particular example described herein and may include additional operations such as those described in the illustrative examples of FIG. 1A, 1B, 3, 4A, 4B or 5.

The processor 230 may include a hardware processing resource, such as one or more Central Processing units (CPUs), semiconductor-based microprocessors, and/or other hardware devices suitable for retrieval and execution of the instructions 240. The processor 230 may fetch, decode, and execute instructions 240. As an alternative or in addition to retrieving and executing instructions, the processor 230 may include one or more electronic circuits that include electronic components for performing the functionality of one or more instructions, such as a field-programmable gate array (FPGA), application-specific integrated circuit (ASIC), or other electronic circuits.

The machine-readable storage medium 235 may be any electronic, magnetic, optical, or other physical storage device that contains or stores executable instructions. Thus, a machine-readable storage medium 235 may be, for example, Random Access Memory (RAM), non-volatile RAM (NVRAM), an Electrically Erasable Programmable Read-Only Memory (EEPROM), a storage device, an optical disc, and the like. In some examples, a machine-readable storage medium may be a non-transitory storage medium, where the term "non-transitory" does not encompass transitory propagating signals.

The network device 215 may be communicatively coupled to an authentication server 220, which may be configured to support one or more authentication protocols. Examples of authentication protocols may include a Remote Authentication Dial-In User Service (RADIUS) protocol or any other authentication protocol. Thus, in some examples, the authentication server 220 may include a RADIUS server component (not shown) that can provide a centralized Authentication, Authorization, and Accounting (AAA) management for users that intend to connect and use a network service. The network device 215 may be configured to exchange Extensible Authentication Protocol (EAP) packets with the client device 205. The network device converts these EAP packets into RADIUS packets and communicates with the authentication server, as per some examples.

Referring now to the instructions 240, it may include instructions 241 that may be executable by the processor 230 that cause the processor 230 to identify a client device intending to connect to a network. In some examples, the client device 205 may associate with the network device 215 using an association process based on the IEEE 802.11 standard.

In some examples, instructions 242 may cause the processor to send an identity-request to the client device 205. The identity-request may include a request-device-data field, which may hint to the client device 205 that the authenticator system (e.g., the authentication server 220) supports device data and may use device data during the authentication process.

In some examples, instructions 243 may cause the processor to receive an identity-response from the client device 205. The identity-response may include an identifier (e.g., username), which enables the authentication server to identify the client device/user. Further, in response to the request-device-data field in the identity-request, the client device 205 may send a device-type information in the form of a response-device-data that may be embedded in the identity-response.

In some examples, instructions 244 may cause the processor to send an access-request to the authentication server 220. Along with the access-request, the network device may send the device-type information received from the client device 205. This enables the authentication server 220 to determine a device category from the device-type information and accordingly, select an appropriate policy for the device category during an identification phase of the authentication process itself. For example, computing devices such as laptops, desktops, etc. may be classified under one device category (e.g., Computer), mobile communication devices, such as cellular phones, can be classified under another device category (e.g., Smartphone).

In some examples, instructions 245 may cause the processor to receive a response (e.g., an access-response) from the authentication server, based on the device category identified. The response from the authentication server may include a rejection of access or an access-challenge to continue negotiation with the client device and for authentication and/or authorization thereof.

In some examples, instructions 246 may cause the processor to negotiate with the client device 205 for authentication thereof. The instructions 246 may enable access to the enterprise network 210, based on successful authentication of the client device. Enabling access to the enterprise network 210 may include allowing the exchange of data traffic. Further, in some examples, the authentication server 220 may apply an appropriate policy (e.g., a device access policy) that is selected by the authentication server 220 based on the identified device category. For example, an appropriate policy may include at least one of network access, permissions/privileges, etc. Thus, the techniques for authentication discussed above may include the exchange of packets/messages, which is elaborated in FIG. 3.

Figure 3:
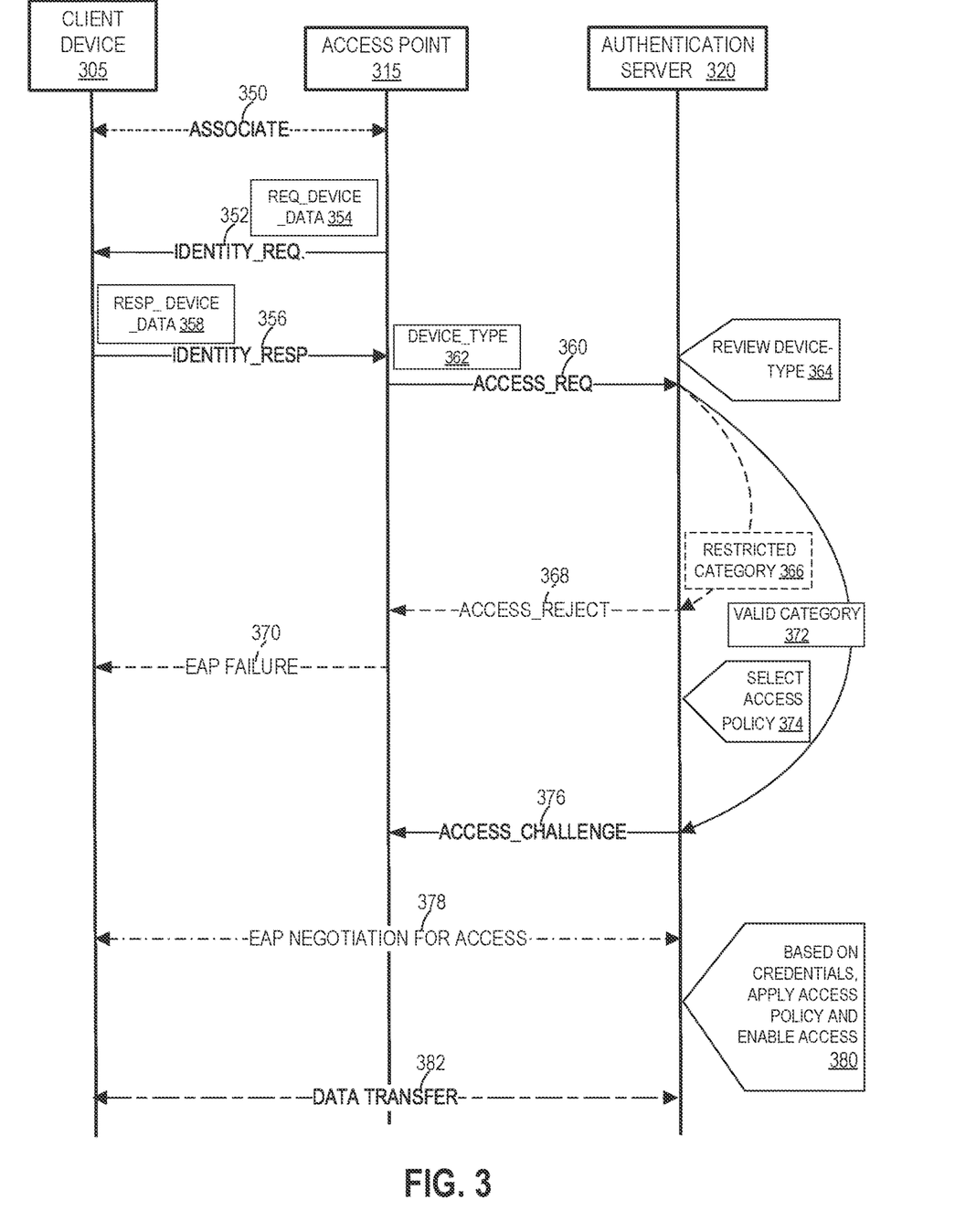
FIG. 3 illustrates an example packet sequence occurring among devices during authentication of a client device, in accordance with the present disclosure.

FIG. 3 illustrates an example of a packet sequence 300 exchanged among devices during authentication of a supplicant, in accordance with the present disclosure. The supplicant may be a Bring Your Own Device (BOYD) or a client device 305 intending to connect to or access an enterprise network (e.g., the enterprise network 110 of FIG. 1). The supplicant may connect to a network device, such as an access point 315. The access point 315 may be communicatively coupled to an authentication server 320, which is used for authentication of the client device. The authentication server 320 may be a server that hosts applications used for authentication. In some examples, the authentication server may include a database of credentials, e.g., usernames, login, digital certificates, keys, and/or passwords, of various authorized users.

In some examples, the client device 305 may associate 350 with the access point 315 using a Service Set Identifier (SSID). For example, a secure SSID may be used to uniquely identify a network to which the client device 305 connects. The SSID may provide limited access whereby access to proprietary information or sensitive resources of the enterprise network is made unavailable. The client device 305 and the access point 315 may be capable of exchanging messages corresponding to authentication, which may be based on EAP.

In some examples, the client device 305 may initiate the authentication process by sending an authentication request to the access point 315. Upon receiving the authentication request or independent of the authentication request, the access point 315 may send an identity-request 352 IDENTITY_REQ to the client device 305. The access point 315 is configured to accept EAP/EAP Over LAN (EAPOL) traffic from the client device 305. Thus, EAP packets may be communicated between the client device 305 and the access point 315. The EAP protocol can be a Layer 2 authentication protocol. When the access point 315 wants to communicate with the authentication server 320, a Layer 3 protocol, such as RADIUS, may be used to encapsulate EAP data for communication between the access point 315 and the authentication server 320. Thus, the access point 315 may act as a bridge between the client device 305 and the authentication server 320. The access point 315 ensures that authentication related packets are sent to the authentication server 320.

Along with the identity-request IDENTITY_REQ, the access point 315 may send a request-device-data 354 REQ_DEVICE_DATA. In some examples, the access point 315 may enable a request-device-data field in a message/frame/packet sent to the client device. In one example, the request-device-data field may be a Boolean field that is set to 'True/1'. In an enabled condition, the client device 305 may be hinted that the authentication server 320 may support/utilize device-type information during the authentication process.

The client device 305 may receive the identity-request IDENTITY_REQ, and in response, it may send an identity-response 356 IDENTITY_RESP to the access point 315. Examples of identity-response IDENTITY_RESP may include identification information, such as a username, user ID, etc. Further, upon identifying that the request-device-data REQ_DEVICE_DATA field is enabled, the client device 305 may send a response-device-data information 358 RESP_DEVICE_DATA along with the IDENTITY_RESP. The response-device-data may be a character field such that the client device can include device-type information.

In some examples, an identity-request and an identity-response may be embedded into an Ethernet frame in the form of an "EAP/EAPOL packet." For example, the Ethernet frame may include a destination MAC field, a source Mac field, an Ethernet type field, a data field, and a Frame Check Sequence (FCS) field. The FCS field may be the tail of the Ethernet frame. The data field may include an EAP/EAPOL packet that may comprise various fields, such as a packet type, a packet body length, and a packet body. For example, a packet type can be identified using a code field. A code value '1' may indicate that it is a request and a code value '2' may indicate that it is a response. The packet may include an identifier field, which can be used to match a response with a request. Further, a length field may be used to specify the length of the EAP/EAPOL packet. A data field may include a 'Type' field to identify a type of EAP/EAPOL packet. The data field can include device data. An example identity-request and an identity-response packet contents are listed below:

Contents of Example Identity-Request (e.g., EAP Identity-Request Packet):
    Code: Request (1) [size: 1 octet]
    Identifier: EAP Packet (0) [size: 1 octet]
    Length: 6 [size: 2 octets]
    Type: Identity (1)
    Request-device-data=True (1) [size: 2 octets]

Contents of Example Identity-Response (e.g., EAP Identity-Response Packet):
Code: Response (2)
Identifier: 1
Length: 40 octets
Type: Identity (1)
Identity: User-1
Response-device-data=[Device Category]; [Device Model]; [Device Firmware];

In some examples, identity-request and identity-response can be exchanged via an EAPOL frame format embedded within an Ethernet frame, as explained above. Further, upon receiving the identity-response IDENTITY_RESP, the access point 315 may check if the device data RESP_DEVICE_DATA information is available in the identity-response IDENTITY_RESP. Then, the access point 315 may send an access-request 360 ACCESS_REQ to the authentication server 320 by embedding the device information (e.g., device-type information 362 DEVICE_TYPE) in the access-request ACCESS_REQ. Hence, as per some examples, a RADIUS packet may be sent by the access point to the authentication server. The RADIUS packet may include attributes with variable length. A Vendor-Specific-Attribute (VSA) may be one example of attributes that can be embedded into the RADIUS packet. The access point may send the device data to the authentication server by embedding that information in a VSA.

The authentication server 320 receives an access-request ACCESS_REQ 360 from the access point 315. In some examples, the authentication server 320 may be a RADIUS server and the access-request can be a RADIUS access-request. The access-request ACCESS_REQ, received from the access point 315, may include the device-type information DEVICE_TYPE. The authentication server 320 may review the device-type information 364. An example of reviewing the device-type information may include, checking the device-type information DEVICE_TYPE to determine whether the client device 305 belongs to any one device category out of a set of device categories, to select a device access policy applicable to the client device 305. For example, the authentication server 320 may comprise one or more device access policies that correspond to one or more device categories, respectively.

In some examples, a client device may belong to a restricted device category 366 whereby the authentication server 320 may send an access rejection message 368 ACCESS_REJECT to the access point 315. The access point 315 further sends an authentication failure message (e.g., EAP FAILURE 370) to the client device, and access to the enterprise network is rejected. For example, the access point 315 may receive an EAP-failure message from the authentication server 320 and the EAP-failure message may be relayed to the client device 305.

Whereas, in some examples, based on the device-type information DEVICE_TYPE, the authentication server 320 may determine that the client device may belong to a valid category 372 and/or select an access policy 374 from a set of device policies. For example, if a client device belongs to a first device category, then a first device access policy may be selected. The selected device policy may be applied to the client device upon successful authentication and/or authorization. Similarly, for a second device category, a second device policy may be selected for application upon authentication and/or authorization. A first device policy may have different access rights compared to a second device policy.

Further, upon selection of a device access policy, the authentication server 320 may send an access challenge 376 ACCESS_CHALLENGE to the access point 315. The access point 315 may continue EAP negotiation for access 378 with the client device 305 for authentication and/or authorization. Based on verification of credentials, the selected device access policy may be immediately applied upon successful authentication and enable access 380 to the client device 305. The client device 305 may be allowed to exchange data 382 with the network, subject to the device access policy, permissions, etc. set by the authentication server 320.

Figure 4A:
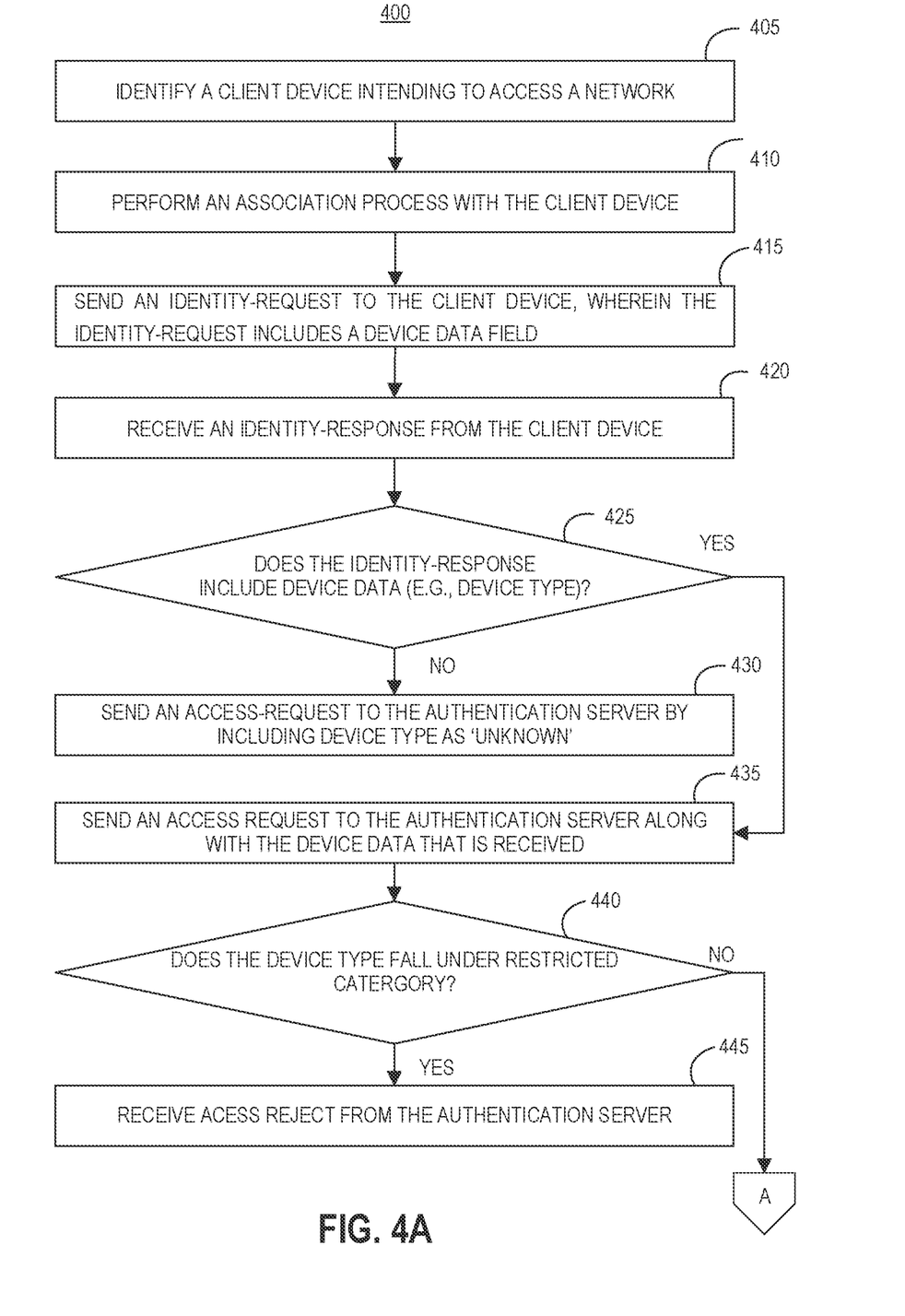
FIG. 4A is an operational flow diagram illustrating an example of device authentication, according to various examples of the present disclosure.

In some examples, a client device may not provide a device data (e.g., RESP_DEVICE_DATA field may be empty). In such instances, the access point 315 may determine the client device 305 as 'unknown' and relay that information to the authentication server 320. Further, the one or more device access policies may include a default access policy such that it can be applied for 'unknown' devices. For example, a default device policy can be defined to proceed with authentication and/or authorization to assign a restricted/limited access to the network environment. For example, a limited access may include allowing IEEE 802.1x related and dropping of packets related to other traffic (e.g., Internet Protocol (IP) related traffic). The access point 315 may undergo a protected authentication exchange with the authentication server 320 facilitated by the access point 315. Examples of techniques of the present disclosure may be further elaborated in detail in the following flow diagram 400.

Figure 4B:
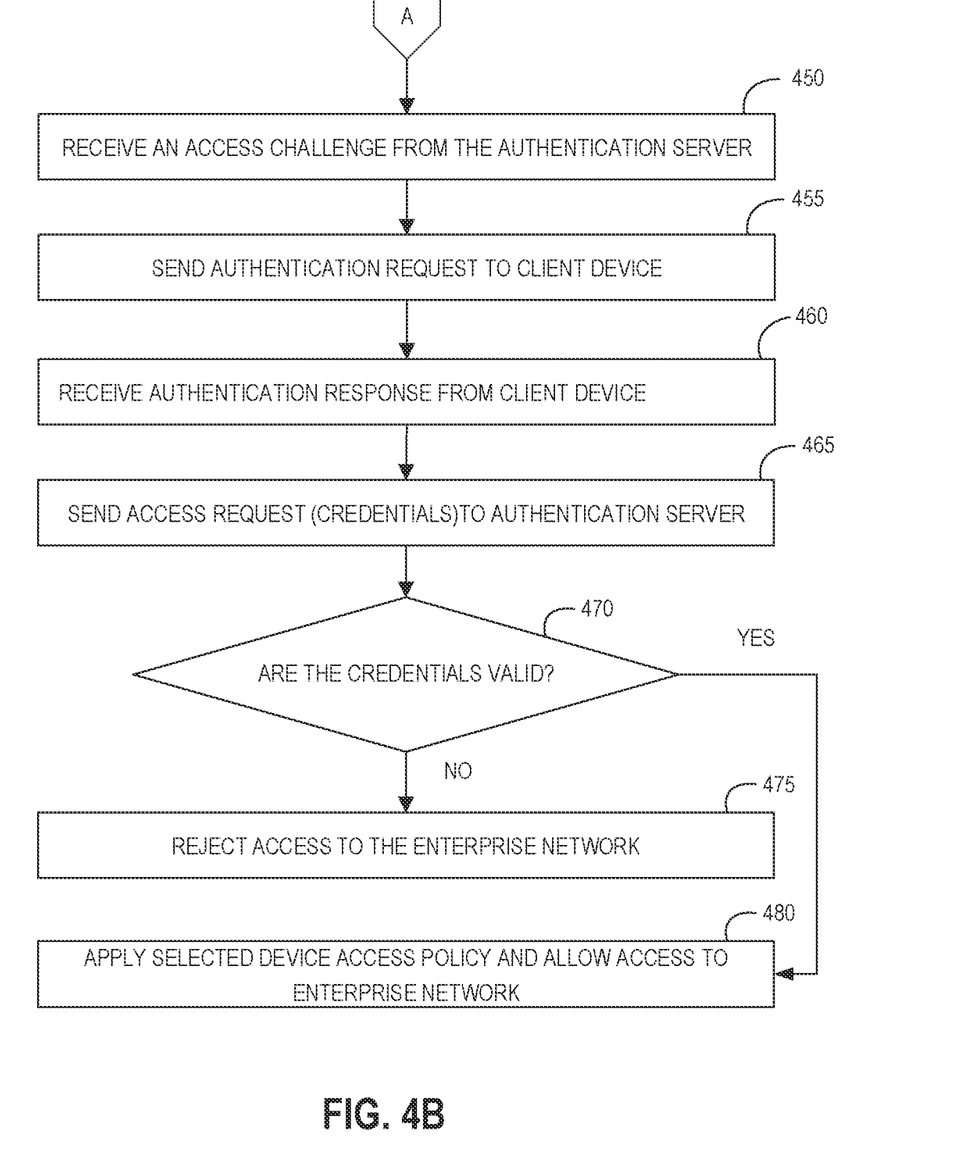
FIG. 4B is a continuation of an operation flow diagram illustrated in FIG. 4A.

FIGS. 4A and 4B illustrate an example flow diagram 400 involving authentication of a client device, for example, a BYOD device, using efficient techniques that enable a selection of a device access policy during an initial phase of the authentication process. According to the examples described herein, flow diagram 400 can be performed by a network device (e.g., the network device 115, 215 as shown in FIGS. 1A & 2), an access point (e.g., the access point 315 of FIG. 3), or the like.

Accordingly, flow diagram 400 is illustrated as a flow chart comprising blocks 405-480. In some examples, the flow diagram 400 may include more or fewer blocks than are shown. Further, in some other implementations, one or more of the blocks of the flow diagram 400 may, at certain times, be ongoing and/or may repeat. Furthermore, in some implementations, two or more blocks of the flow diagram 400 may be combined.

At block 405, the access point may identify a client device that is intending to connect to a network. The network may include the network environment 100 of FIG. 1 or an enterprise network.

At 410, the client device and the access point may perform an association process. The client device may associate with the access point based on the IEEE 802.11 standard and an association process defined under the wired standard. Completion of an association process may enable the client device to participate in an authentication process.

At block 415, the access point may send an identity-request to the client device. Examples of identity-request may include an EAP-request, an identity frame, or the like. The identity-request sent by the access point may comprise a request device data field in an enabled condition. The request device data field may be a Boolean field, which is set to 'True.' The device data field may indicate to the client device that the authenticator system is capable of handling device data. In some examples, the authenticator system may include the access point and an authentication server. In some further examples, the authenticator system may include additional component(s) that may be associated with the authentication process.

At block 420, the access point may receive an identity-response from the client device. The access point may enable an exchange of authentication traffic until the client device undergoes a successful authentication. The identity-response may include information associated with a user (e.g., the client device), such as username, employee number, vendor code, etc. Further, the client device may include response device data, which can be a character (CHAR), or a string embedded into the identity-response. For example, the identity-response can be in the form of an identity-response frame.

In the ongoing example, at block 425, the access point may check if the identity-response may include a device-type information. The access point may check if the identity-response (e.g., the identity-response frame, an EAP response frame) may include the device data. Thus, according to some examples, the device-type information can be received within a shorter time from the time of initiation of negotiation with the client device, thereby improving overall wait time for each client device intending to connect to the network.

At block 430, based on a determination that the identity-response does not include a device data ('NO' condition at block 425), the access point may send an access-request to the authentication server by including the device data as 'unknown.' The device-type information may be set as optional and certain client devices may not include the device-type information in the identity-response. In such instances, the authentication server may categorize the client device under an unknown device category. The authentication server may select a device access policy that offers limited/restricted access (e.g., a restricted access policy) to network resources/applications. Upon successful authentication of the client device, the client device may be applied with the restricted access policy.

At block 435, based on a determination that the identity-response may include a device data ('YES' condition at block 425), the access point may send an access-request to the authentication server by including the device data in the access-request. In some examples, the access point may include the device-type data in form of a VSA in access-request being sent to authentication server.

Further, the authentication server may categorize the device into a device category from a set of device categories. Accordingly, each device category may include a corresponding device access policy. For example, if a user intends to connect to the network via an authorized laptop, then the authentication server may identify the device-type information and categorize it under an appropriate device category. That particular device category may have an associated device access policy. The authentication server identified a policy to process the authentication request.

At block 440, the authentication server may check if the device-type information corresponding to the client device is authorized to connect to the network. For example, certain device-type information may be restricted from connecting to the network. Thus, the authentication server may check if the device-type information falls into a restricted device category.

At block 445, based on a determination that the client device falls into a restricted device category (YES' condition at block 440), the access point receives an access rejection message from the authentication server. Thus, the authenticator system may permit further negotiation with client devices that do not fall into the restricted device category.

Whereas, at block 450, in response to a determination that the client device does not fall under the restricted device category ('NO' condition at block 440), the access point may receive an access-challenge from the authentication server. Also, the authentication server may check and identify a device category under which the client device falls. A device access policy may be identified that corresponds to the identified device category. In other words, the authentication server may be configurable to select pre-defined access to at least two different client devices of at least two different types. Further, the access-challenge may correspond to a request for additional information from the client device based on which access to the network may be provided to the client device. In other words, the access-challenge may include an authentication method, which the authentication server may utilize to authenticate the client device. Further, the access point may facilitate exchange of authentication information between the authentication server and the client device.

In some examples, at block 455, the access point may send an authentication request (e.g., EAP-request, for authentication) to the client device. The authentication request may correspond to the authentication-challenge, which is relayed by the access point to the client device.

At block 460, the access point may receive an authentication response (e.g., EAP-response) from the client device. In some examples, the authentication response may be a response to the access-challenge, and it may also include user credentials.

At block 465, the access point may again send an access-request to the authentication server. The authentication server may accept/access-reject to the network, based on the credentials provided by the client device. For example, at block 470, the authentication server may check the validity of the credentials.

At block 475, based on a determination that the credentials are not valid ('NO' condition at block 470), the access point may receive an access rejection from the authentication server. The access point may relay the access rejection (e.g., EAP failure message) to the client device and may deny access for the client to the network.

At block 480, based on a determination that the credentials provided by the client device are valid ('YES' condition at block 470), the access point may allow access to the client device, and a selected device access policy may be applied to the client device.

Figure 5:
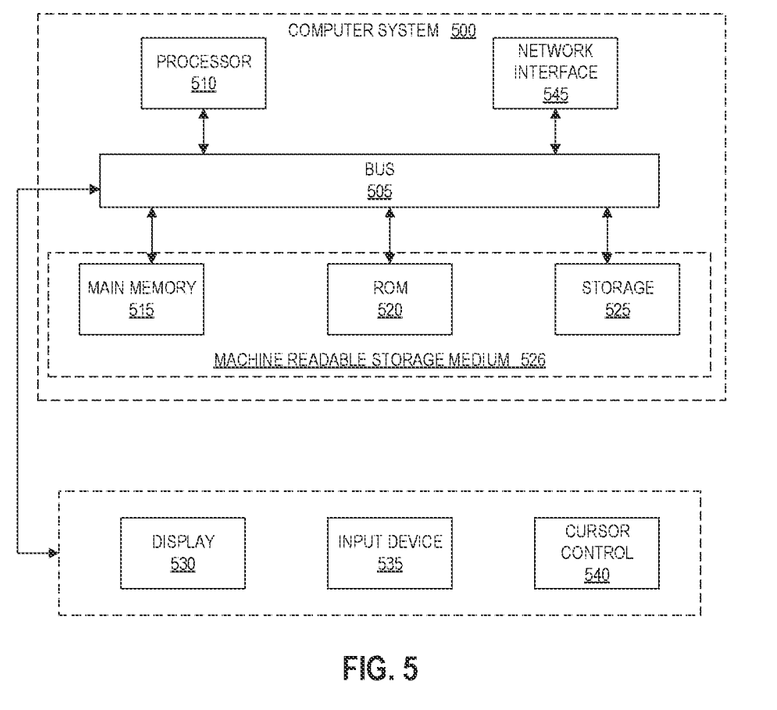
FIG. 5 illustrates an example computer system that may be used in implementing various examples discussed herein.

FIG. 5 depicts a block diagram of an example computer system 500 in which at least a portion of the disclosed authenticator system/method may be implemented. Furthermore, it should be appreciated that although the various instructions are illustrated as being co-located within a single processing unit, such as the processor 230 (shown in FIG. 2), in implementations in which processor(s) may include multiple processing units, one or more instructions may be executed remotely from the other instructions.

The computer system 500 may include a bus 505 or other communication mechanisms for communicating information, one or more hardware processors 510 coupled with bus 505 for processing information. Hardware processor(s) 510 may be, for example, one or more general-purpose microprocessors.

The computer system 500 also may include a main memory 515, such as a random access memory (RAM), cache, and/or other dynamic storage devices, coupled to bus 505 for storing information and instructions to be executed by the processor 510. Main memory 515 also may be used for storing temporary variables or other intermediate information during the execution of instructions to be executed by processor 510. Such instructions, when stored in storage media accessible to processor 510, render computer system 500 into a special-purpose machine that is customized to perform the operations specified in the instructions.

The computer system 500 further may include a read-only memory (ROM) 520 or other static storage device coupled to bus 505 for storing static information and instructions for processor 510. A storage device 525, such as a magnetic disk, optical disk, or USB thumb drive (Flash drive), etc., is provided and coupled to bus 505 for storing information and instructions.

The computer system 500 may be coupled via bus 505 to a display 530 for displaying information to a computer user. An input device 535, including alphanumeric and other keys, is coupled to bus 505 for communicating information and command selections to processor 510. Another type of user input device is a cursor control 540 for command selections to processor 510. This and other modules may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

According to one example, the techniques herein are performed by computer system 500 in response to processor (s) 510 executing one or more sequences of one or more instructions contained in main memory 515. Such instructions may be read into main memory 515 from another storage medium, such as storage device 525. Execution of the sequences of instructions contained in main memory 515 causes processor(s) 510 to perform the process steps described herein. In alternative examples, hard-wired circuitry may be used in place of or in combination with software instructions.

The computer system 500 also may include a network interface 545 coupled to bus 505. Network interface 545 provides a two-way data communication coupling to one or more network links that are connected to one or more local networks. For example, the network interface 545 may be a local area network (LAN) card to provide a data communication connection to a compatible LAN (or WAN component to communicate with a WAN). Wireless links may also be implemented. In any such implementation, network interface 545 sends and receives electrical, electromagnetic, or optical signals that carry digital data streams representing various types of information. The signals through the various networks and the signals on the network link and through the network interface 545, which carry the digital data to and from computer system 500, are an example of forms of transmission media.

In some examples, the machine-readable storage medium 526 (e.g., one or more of the main memory 515, the ROM 520, or the storage device 525) may store instructions which when executed by the processor 510 may cause the processor 510 to execute methods described in FIGS. 1A-4B. Some examples of instructions which when executed by the processor 510 may cause the processor 510 to identify a client device intending to connect to a network. The instructions may cause the processor 510 to send an identity-request to the client device. The identity-request may include a request-device-data field. The instructions may cause the processor 510 to receive an identity-response from the client device. The identity-response may include a response-device-data field. The instructions may cause the processor 510 to send an access-request to an authentication server along with a device-type information identified from the response-device-data field. Further, the instructions may cause the processor 510 to receive an access response, for example, an EAP request (e.g., an EAP method) from the authentication server, determined based on the identified device-type information. Furthermore, the instructions may cause the processor 510 to negotiate with the client device (e.g., EAP negotiation). The client device may be enabled access to the network based on a successful authentication of the client device.

The computer system 500 can send messages and receive data, including program code, through the network(s), network link, and the network interface 545. In the Internet example, a server might transmit a requested code for an application program through the Internet, the ISP, the local network, and the network interface 545.

The received code may be executed by processor 510 as it is received, and/or stored in storage device 525, or other non-volatile storage for later execution. Each of the processes, methods, and algorithms described in the preceding sections may be embodied in, and fully or partially automated by, code components executed by one or more computer systems or computer processors comprising computer hardware. The one or more computer systems or computer processors may also operate to support the performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate or may be performed in parallel, or in some other manner. Blocks or states may be added to or removed from the disclosed examples. The performance of certain operations or processes may be distributed among computer systems or computers processors, not only residing within a single machine but deployed across a number of machines. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open-ended as opposed to limiting. Adjectives such as "standard," "known," and terms of similar meaning should not be construed as limiting the item described to a given period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method of authenticating a client device, comprising:
   detecting, by an access point, the client device seeking to connect to a network, wherein the client device is wirelessly connected to a wireless interface of the access point, and the access point is an intermediary between the client device and an authentication server;
   sending, by the access point, an identity-request to the client device, wherein the identity-request comprises a request for a device type of the client device;
   receiving, by the access point, an identity-response from the client device, wherein the identity-response comprises a field included in the identity-response by the client device based on the request for the device type in the identity-request, the field comprising device-type information regarding the device type of the client device;
   obtaining, by the access point, the device-type information from the field in the identity-response;
   sending, by the access point, an access-request from the access point to the authentication server, wherein the access-request includes the device-type information obtained from the field in the identity-response;
   receiving, by the access point, an access-response from the authentication server, wherein the access-response is determined based on the device-type information included in the access-request;
   based on the access-response from the authentication server, negotiating, by the access point, with the client device for authentication of the client device, and enabling access of the client device to the network based on the authentication of the client device;
   sending, from the access point to the authentication server, a further access-request including device-type information identifying a device type of a further client device detected by the access point; and
   receiving, at the access point from the authentication server, an access rejection to prevent access to the network by the further client device, wherein the access rejection is responsive to a determination by the authentication server based on the device-type information in the further access-request that the further client device belongs to a restricted device category.

2. The method of claim 1, wherein the identity-request is an Extensible Authentication Protocol (EAP)-identity-request, and the EAP-identity-request comprises a request-device-data field set to True.

3. The method of claim 1, wherein the identity-response is an Extensible Authentication Protocol (EAP)-identity-response, and the EAP-identity-response comprises the field comprising the device-type information.

4. The method of claim 1, further comprising:
   identifying, by the authentication server based on the device-type information included in the access-request from the access point, a device category from a set of device categories;
   selecting, by the authentication server from a plurality of different access policies, an access policy applicable to the identified device category; and
   based on the authentication of the client device, applying, by the authentication server, the selected access policy to the client device.

5. The method of claim 1, wherein a presence of the request for the device type in the identity-request is indicated by an indicator set to an enabled condition in the identity-request.

6. The method of claim 5, wherein the indicator comprises a Boolean field that when set to true indicates that the request for the device type is present in the identity-request.

7. The method of claim 5, wherein the device-type information is included in the identity-response by the client device based on the client device detecting that the indicator is set to the enabled condition.

8. The method of claim 1, wherein the access-request comprises a Remote Authentication Dial-In User Service (RADIUS) access-request, and the device-type information is included in a Vendor-Specific-Attribute (VSA) of the RADIUS access-request.

9. The method of claim 1, wherein the access-response is responsive to a determination by the authentication server based on the device-type information included in the access-request that the client device does not belong to a restricted device category.

10. An access point comprising:
    a wireless interface to connect wirelessly to a client device;
    a processor; and
    a non-transitory storage medium comprising instructions executable on the processor to:
       detect the client device seeking to connect to a network, wherein the access point is an intermediary between the client device and an authentication server;
       send an identity-request from the access point to the client device, wherein the identity-request comprises a request-device-data field to request device-type information of a device type of the client device;
       receive, at the access point, an identity-response from the client device, wherein the identity-response comprises a response-device-data field included in the identity-response by the client device based on the request-device-data field in the identity-request, the response-device-data field comprising the device-type information;
       obtain, at the access point, the device-type information from the response-device-data field;
       send an access-request from the access point to the authentication server, wherein the access-request includes the device-type information obtained from the response-device-data field;

receive an access-response at the access point from the authentication server, wherein the access-response is determined based on the device-type information included in the access-request;

based on the access-response from the authentication server, negotiate, by the access point, with the client device for authentication of the client device, and enable access of the client device to the network based on the authentication of the client device;

send, from the access point to the authentication server, a further access-request including device-type information identifying a device type of a further client device detected by the access point; and receive, at the access point from the authentication server, an access rejection to prevent access to the network by the further client device, wherein the access rejection is responsive to a determination by the authentication server based on the device-type information in the further access-request that the further client device belongs to a restricted device category.

11. The access point of claim 10, wherein the access-response is an access-challenge provided by the authentication server based on a determination that the device-type information indicates that the client device does not belong to a restricted device category.

12. The access point of claim 10, wherein the instructions are executable on the processor to:

detect the further client device seeking to connect to the network;

send a further identity-request from the access point to the client device, wherein the further identity-request comprises a request-device-data field to request the device-type information of the device type of the further client device; and receive, at the access point, a further identity-response from the further client device, wherein the further identity-response comprises a response-device-data field included in the further identity-response by the further client device based on the request-device-data field in the further identity-request, the response-device-data field of the further identity-response comprising the device-type information of the further client device.

13. The access point of claim 10, wherein a presence of the request-device-data field in the identity-request is indicated by an indicator set to an enabled condition in the identity-request.

14. The access point of claim 13, wherein the indicator comprises a Boolean field that when set to true indicates that the request-device-data field is present in the identity-request.

15. The access point of claim 10, wherein the instructions are executable on the processor to:

drop, at the access point, data traffic received from the client device during the authentication of the client device; and allow, at the access point, data traffic based on a device policy selected by the authentication server and based on a successful authentication of the client device.

16. The access point of claim 10, wherein the device-type information is probed by the access point via the identity-request to enable the authentication server to identify a device access policy during an identity phase of authentication.

17. A non-transitory storage medium comprising instructions that upon execution cause an access point to:

detect a client device seeking to connect to a network, wherein the client device is wirelessly connected to a wireless interface of the access point, and the access point is an intermediary between the client device and an authentication server;

send an identity-request from the access point to the client device, wherein the identity-request comprises a request for a device type of the client device, the identity-request is an Extensible Authentication Protocol (EAP)-identity-request, and the EAP-identity-request comprises a request-device-data field set to True;

receive an identity-response at the access point from the client device, wherein the identity-response comprises a field included in the identity-response by the client device based on the request for the device type in the identity-request, the field comprising device-type information regarding the device type of the client device;

obtain the device-type information from the field in the identity-response;

send an access-request from the access point to the authentication server, wherein the access-request includes the device-type information obtained from the field in the identity-response;

receive an access-response at the access point from the authentication server, wherein the access-response is determined based on the device-type information included in the access-request; and based on the access-response from the authentication server, negotiate, by the access point, with the client device for authentication of the client device, and enable access of the client device to the network based on the authentication of the client device.

18. The non-transitory storage medium of claim 17, wherein the instructions upon execution cause the access point to:

send, from the access point to the authentication server, a further access-request including device-type information identifying a device type of a further client device detected by the access point; and receive, at the access point from the authentication server, an access rejection to prevent access to the network by the further client device, wherein the access rejection is responsive to a determination by the authentication server based on the device-type information in the further access-request that the further client device belongs to a restricted device category.

19. The non-transitory storage medium of claim 17, wherein the identity-response is an EAP-response packet, and the EAP-response packet includes the field that includes a character value.

* * * * *